Patented Aug. 3, 1954

2,685,495

UNITED STATES PATENT OFFICE 2,685,495

PROCESS FOR PRINTING WITH DYESTUFFS OF SUBSTANTIVE CHARACTER AND PRINTING PREPARATION THEREFOR

Jacques Wegmann and Karl Menzi, Basel, Switzerland, assignors to Ciba Limited, Basel, Switzerland, a Swiss firm No Drawing. Application September 5, 1950, Serial No. 183,284

Claims priority, application Switzerland September 19, 1949

14 Claims. (Cl. 8—62)

This invention relates to a process for printing with dyestuffs of substantive character, viz. dyestuffs possessing an affinity for cellulosic fibers. As used herein, the term cellulosic fibers comprises the fibers containing native or regenerated cellulose; it does not comprise fibers from cellulose esters such as cellulose acetate.

The invention is based on the observation that valuable prints can be produced when a printing preparation is employed which contains a metal complex compound which is difficultly soluble per se, of a substantive dyestuff, together with an organic nitrogen base which corresponds to the general formula

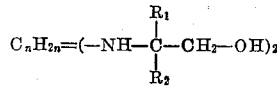

in which $R_1$ indicates a hydrogen atom, an alkyl group with at most three carbon atoms or a hydroxymethyl group, $R_2$ a hydrogen atom or a methyl group and $n$ a whole number which is at most 4 but advantageously 2.

The difficultly soluble metal complex compounds of substantive dyestuffs which are suitable for the present process may contain as complex combined metal for example chromium or iron but especially a metal of an atomic number ranging from 27 to 29, viz. nickel, cobalt or preferably copper. The metal-free dyestuffs from which they are derived are to be substantive and therefore contain one or more of the known substantive groupings. As such may be mentioned the acid amide, especially urea, group, the 1:3:5-triazine grouping, the para-diamine structure, the benzidine radical, the radical of 2-amino-5-hydroxynaphthalene-7-sulfonic acid or of an N-substitution product thereof and so on. In order that the metal complex compounds produced therefrom shall be difficultly soluble, the metal-free initial dyestuffs on which they are based must not contain too great a number of groups imparting solubility. Such metal complex compounds are for example considered to be of difficult solubility when, in the absence of bases, they possess at 80° C. a solubility of less than 0.5 gram per liter in 1 per cent. sodium carbonate solution.

The metal complex compounds employed for the present process may for example be of the type of the ortho:ortho'-dihydroxyazo-metal complexes or of the type of the ortho-hydroxy-ortho'-carboxy-azo-metal complexes. In addition there are also individual dyestuffs of which the metal complexes are based upon the salicylic acid grouping and salicylic acid groupings may also take part in the complex formation in addition to the other groupings set forth above.

A number of very valuable dyestuffs which are suitable for the present process are obtained from tetrazotized 3:3' - dihydroxy - 4:4' - diaminodiphenyl and also from tetrazotized 4:4'-diaminodiphenyl-3:3'-dicarboxylic acid or -3:3'-di-(hydroxyacetic acid) and coupling components which couple in ortho-position to a hydroxyl group, as for example 1-hydroxynaphthalenes which couple in 2-position, 2-hydroxynaphthalenes and pyrazolones. Such dyestuffs may also be produced by coupling of ortho-hydroxy- or ortho-carboxy-diazo compounds of the benzene series with components of marked substantive character, such as N-derivatives of 2-amino-5-hydroxynaphthalene-7-sulfonic acid of good substantivity, or pyrazolones, especially dipyrazolones, which contain substantive groupings, as for example one or more diphenyl groupings.

The printing preparations to be employed for the present process may contain, as bases which correspond to the formula initially specified, for example those of the following constitution:

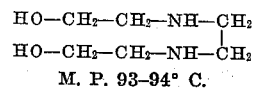

M. P. 93–94° C.

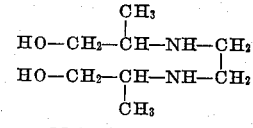

M. P. 136–139° C.

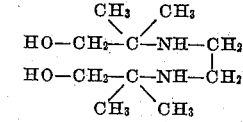

M. P. 177–181° C.

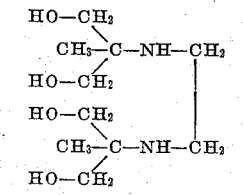

M. P. 154–157° C.

These bases may be produced for example in an analogous manner to that described in German Patent No. 635,904 by condensation of hydroxyalkylamines with dihalogen alkyls.

The metal complex compounds of substantive dyestuffs specified for incorporation into the printing preparation may if desired be produced in substance. In many cases it is however possible to produce them immediately before the production of the printing preparations, from the corresponding metal-free dyestuffs and suitable metal compounds. In this case it is advantageous to produce the metal complexes under such conditions that a strongly acid reaction of the medium is avoided, for example by the application of sodium metal tartrates as agents providing metal. It is possible for example to proceed in such a manner that a metal-free dyestuff is dissolved in relatively little water and brought to the boil with a mixture of the nitrogen base to be used, for example 1:2-di-(β-hydroxy-ethylamino)-ethane, and sodium copper tartrate. A solution thus obtained can thereupon be stirred immediately into the thickening to be used in the printing. A metal compound of such a dyestuff, produced in substance, can be brought to the boil directly with the nitrogen base to be used and by this means brought into solution. In all cases it is advantageous to use, as substances promoting solubility, hydrotropic agents, especially urea which is frequently proposed for printing purposes.

Since some complex compounds produced in such a manner are sensitive to reduction, it is as a rule advantageous to avoid printing thickenings, such as British gum, which possess a marked reducing action and to select in preference as printing thickenings vegetable mucilages, for example tragacanth thickening.

The printing process can otherwise be carried out in the known manner, with drying, steaming and rinsing after the application of the printing preparation. The circumstance is of advantage that as a rule a relatively short steaming period of about 10 minutes is sufficient in order to obtain fully fixed prints. The prints can if desired be after-treated in known manner with a condensation product of dicyandiamidine or similar compounds and formaldehyde.

There are obtained according to the present process in general very fast prints on cellulosic fibers which as regards strength are surprisingly in no way inferior to those which are obtained by printing with the corresponding metal-free dyestuffs and after-metallization of the dyestuffs on the fiber. The printing process is extremely simple and easy to carry out.

The following examples illustrate the invention the parts and percentages being by weight:

*Example 1*

0.5 part of the alkaline coupling dyestuff from 1 mol of tetrazotized 3:3'-dihydroxy-4:4'-diaminodiphenyl and 2 mols of 2-amino-5-hydroxynaphthalene-7-sulfonic acid is mixed with 30 parts of urea and the whole covered with 60 parts of hot water. After addition of 4 parts of 1:2-di-(β-hydroxyethylamino)-ethane and 10 parts of a 10 per cent. solution of sodium copper tartrate, the mixture is brought to the boil whereby the dyestuff dissolves. The solution produced is stirred into 100 parts of neutralized tragacanth thickening (60/1000). The printing preparation obtained can be used immediately on cooling; it is however stable and can be used with the same result even after prolonged standing.

After printing of the preparation on cotton or regenerated cellulose the goods are dried, steamed for 10 minutes and thoroughly rinsed with cold water, in which operation it is advantageous to add to the final rinsing bath 2 grams per liter of a condensation product from dicyan-diamidine and formaldehyde. The goods can be soaped at 60° C. although this process of development of the color shade is not necessary.

A pure blue print is obtained of excellent fastness to light and washing and of a strength which corresponds at least to that which is obtained when, according to the known process, the uncoppered dyestuff is used for printing and, after steaming, is coppered in an after-treatment bath.

If instead of the above specified dyestuff 0.5 part is taken of the dyestuff from 1 mol of 4:4'-diamino-diphenyl-3:3'-dicarboxylic acid and 2 mols of 1-(6'-sulfo-2'-naphthyl)-3-methyl-5-pyrazolone and the process is otherwise conducted as described above, an orange print is obtained likewise of good fastness properties.

*Example 2*

0.5 part of the dyestuff from 1 mol of tetrazotized 3:3'-dihydroxy-4:4'-diaminodiphenyl and 2 mols of 2-β-hydroxyethylamino-5-hydroxynaphthalene-7-sulfonic acid of the formula

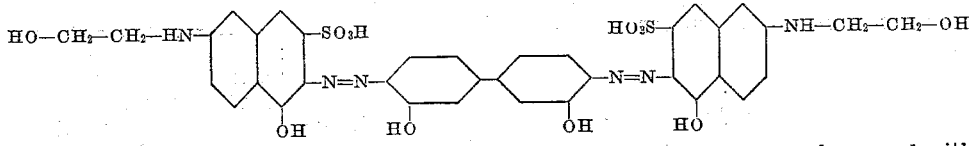

is mixed with 30 parts of urea and covered with 60 parts of hot water. After addition of 4 parts of 1:2-di-(β-hydroxy-ethylamino)-ethane and 10 parts of a 10 per cent. solution of sodium copper tartrate, the solution is brought to the boil and stirred into 100 parts of neutralized tragacanth thickening (60/1000). The printing color obtained is stable and yields on cotton after printing, drying, steaming for 10 minutes and thorough rinsing a pure, greenish blue shade of excellent fastness to light and washing.

*Example 3*

1 part of the nickel compound of the dyestuff from 1 mol of tetrazotized 3:3'-dihydroxy-4:4'-diaminodiphenyl and 2 mols of 2-β-hydroxyethyl-amino-8-hydroxynaphthalene-6-sulfonic acid is mixed with 20 parts of urea and covered with 55 parts of water. After addition of 4 parts of 1:2-di-(β-hydroxyethylamino)-ethane the solution is brought to the boil and stirred into 120 parts of neutralized tragacanth thickening (60/1000).

Printing is carried out, followed by drying, steaming for 10 minutes in the Mather-Platt or in the star steamer and thorough rinsing in cold water.

The print obtained is a bluish-grey of excellent fastness to light and washing.

Instead of the above-mentioned nickel compound the cobalt compound of the same dyestuff can be used, a similar color shade being obtained which is likewise of good fastness to light and washing.

*Example 4*

1 part of the copper compound of the dyestuff from 1 mol of tetrazotized 3:3'-dihydroxy-4:4'-diaminodiphenyl and 2 mols of 2-β-hydroxyethylamino-5-hydroxynaphthalene-7-sulfonic acid is mixed with 30 parts of urea, covered with 65 parts of hot water and after the addition of 4 parts of 1:2-di-(β-hydroxyethylamino)-ethane dissolved by bringing to the boil. The solution produced is stirred into 100 parts of neutralized tragacanth thickening (60/1000).

Printing is carried out, followed by drying and steaming for 10 minutes in the Mather-Platt or in the star steamer and thorough rinsing in cold water, it being advantageous to add in the final rinsing bath 2 grams per liter of a condensation product from dicyandiamidine and formaldehyde. The greenish-blue print obtained is excellently fixed and withstands, without bleeding out, a treatment for 10 minutes in a boiling soap bath (5 grams of soap and 2 grams of anhydrous sodium carbonate per liter of water); the fastness to light is likewise excellent.

By using 1 part of the copper compound of the dyestuff from 1 mol of tetrazotized 3:3'-dihydroxy-4:4'-diaminodiphenyl and 2 mols of 2-amino-5-hydroxynaphthalene-7-sulfonic acid instead of the dyestuff above specified, a somewhat more reddish blue likewise of good fastness properties is obtained.

In the case of both dyestuffs it is not possible to select the printing thickening without discrimination, since for example with British gum thickening, probably owing to reduction phenomena, considerably redder prints are obtained and on regenerated fibers the dyestuff is to some extent destroyed. The above described printing color however yields both on natural and also on regenerated fibers an unobjectionable result.

Example 5

1 part of the copper compound of the dyestuff from 1 mol of tetrazotized 4:4'-diaminodiphenyl-3:3'-dicarboxylic acid and 1 mol of 1-hydroxynaphthalene-5-sulfonic acid on the one hand and 1 mol of 2-phenylamino-5-hydroxynaphthalene-7-sulfonic acid on the other, is mixed with 20 parts of urea and covered with 55 parts of hot water. After addition of 4 parts of 1:2-di-(β-hydroxyethylamino)-ethane, solution is brought about by bringing to the boil and is then stirred into 120 parts of neutralized tragacanth thickening (60/1000).

Printing is carried out followed by drying, steaming for 10 minutes in the Mather-Platt or in the star steamer and thorough rinsing in cold water, in which case in the final rinsing bath 2 grams per liter are added of a condensation product from dicyandiamidine and formaldehyde.

A pure vivid violet is obtained of good fastness to washing and excellent fastness to light.

Example 6

1 part of the copper compound of the dyestuff from 1 mol of 3:3'-dihydroxy-4:4'-diaminodiphenyl and 2 mols of 1-(6'-sulfo-2'-naphthyl)-3-methyl-5-pyrazolone is mixed with 20 parts of urea and covered with 55 parts of hot water. After addition of 4 parts of 1:2-di-(β-hydroxyethylamino)-ethane the solution is brought to the boil and stirred into 120 parts of neutralized tragacanth thickening (60/1000).

With this printing color there are produced on cotton and viscose Bordeaux red shades of good fastness to light and washing by the operation of printing, drying, steaming for 10 minutes and rinsing for 15 minutes in the cold with the addition of 2 grams per liter of the condensation product from dicyandiamidine and formaldehyde to the last rinsing bath.

By using instead of the above specified dyestuff 1 part of the copper compound of the dyestuff from 1 mol of tetrazotized 3:3'-dihydroxy-4:4'-diaminodiphenyl and 1 mol of 2-hydroxynaphthalene on the one hand and 1 mol of 2-amino-7-hydroxynaphthalene-7-sulfonic acid on the other and proceeding otherwise as above described, there is obtained a powerful blue likewise of excellent fastness to light and washing.

Example 7

1 part of the copper compound of the dyestuff of the formula

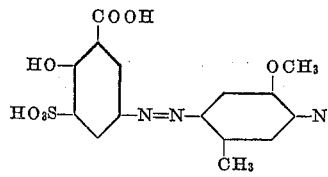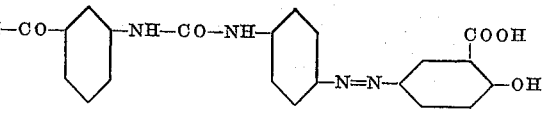

is mixed with 20 parts of urea, 4 parts of 1:2-di-(β-hydroxyethylamino)-ethane are added and the whole is covered with 55 parts of hot water. After bringing to the boil the solution is stirred into 120 parts of neutralized tragacanth thickening (60/1000).

With this printing color there is obtained on cotton and viscose after the print has been dried, steamed for 10 minutes and thoroughly rinsed, an excellently fixed powerful greenish-yellow.

If instead of the above-mentioned copper compound 1 part of the copper compound of the dyestuff of the formula:

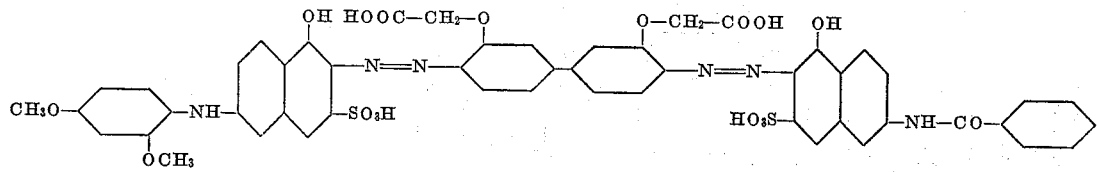

is used a dull blue is obtained of very good fastness to light and washing.

Example 8

1 part of the copper compound of the dyestuff of the formula:

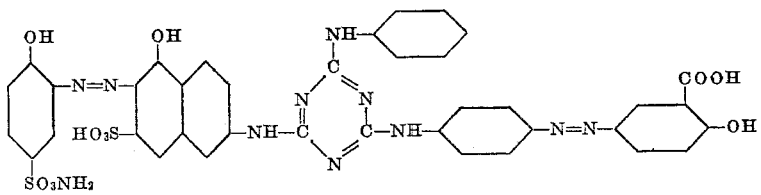

is mixed with 20 parts of urea and 4 parts of 1:2-di-(β-hydroxyethylamino)-ethane and 53 parts of hot water added together with 2 parts of 30 per cent. sodium hydroxide solution. After bringing the solution to the boil it is stirred into 120 parts of neutralized tragacanth thickening (60/1000).

By printing with this color on cotton or viscose, drying, steaming for 10 minutes and thoroughly rinsing, a reddish brown print which is fast to light and washing is obtained.

By using instead of the above specified dyestuff 1 part of the copper compound of the dyestuff of the formula

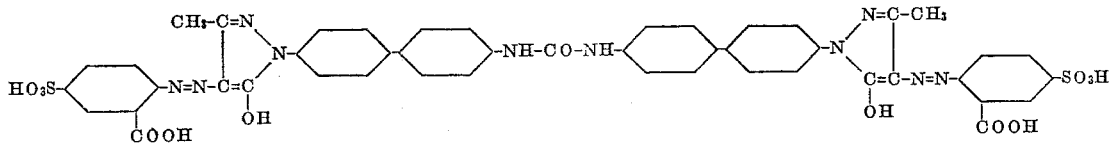

there is obtained according to the above directions a pure yellow of excellent fastness to light and superior fastness to washing.

With 1 part of the copper compound of the dyestuff of the formula

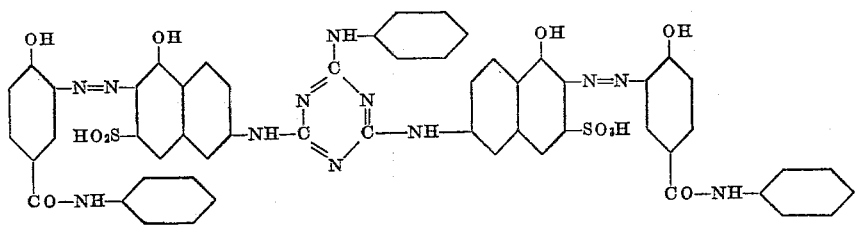

there is produced a pure ruby red of very good fastness to washing and excellent fastness to light.

Example 9

1 part of the dyestuff of the formula

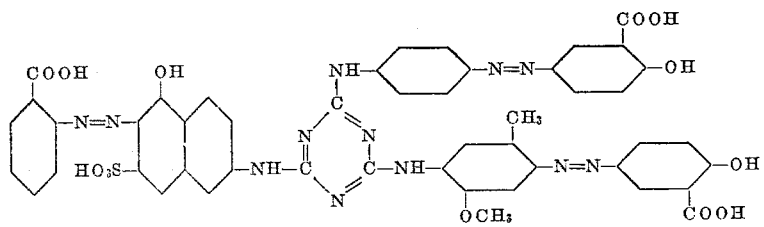

is mixed with 4 parts of 1:2-di-(β-hydroxyethylamino)-ethane and 123 parts of water are added. The dyestuff is dissolved by bringing to the boil and the solution stirred into a mixture of 220 parts of neutralized tragacanth thickening (60/1000) and 40 parts of urea and finally 12 parts added of a 10 per cent. solution of sodium copper tartrate.

By printing with this color on cotton or regenerated cellulose, drying, steaming for 10 minutes and thoroughly rinsing a brownish yellow print is obtained which is fast to light and washing.

By employing instead of the above specified dyestuff 1 part of the dyestuff of the formula

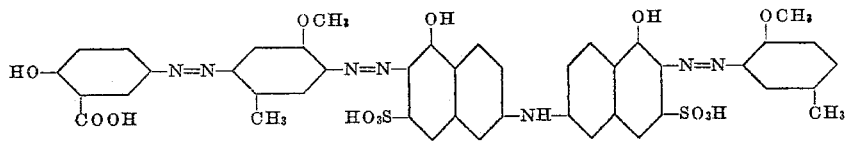

there is obtained according to the above directions a reddish blue of good fastness to washing and light.

Both prints are at least as strong and pure in shade as when the same dyestuffs are printed according to known processes and after steaming treated in an after-coppering bath.

A yellow print is obtained when the dyestuff of the formula

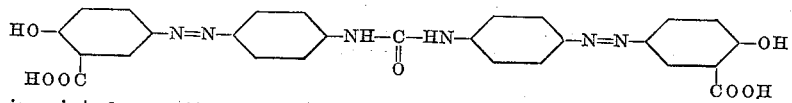

is printed on cotton or regenerated cellulose according to the above directions.

*Example 10*

1 part of the copper compound of the dyestuff mentioned in Example 9 (first paragraph) is mixed with 4 parts of 1:2-di-(β-hydroxyethylamino)-ethane, covered with 135 parts of water, the solution brought to the boil and stirred into a mixture of 220 parts of neutralized tragacanth thickening and 40 parts of urea.

Printing and finishing are carried out as described in Example 9 and a print is obtained of equal value in all respects.

By using instead of the above specified dyestuff 1 part of the copper compound of the dyestuff set forth in Example 9 (second paragraph), a reddish blue of equal value is obtained by the directions given.

*Example 11*

1 part of the copper compound of the dyestuff of the formula

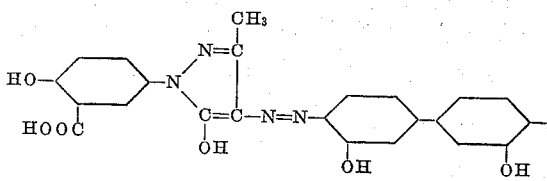

is mixed with 4 parts of 1:2-di-(β-hydroxyethylamino)-ethane and the whole covered with 135 parts of hot water. After bringing to the boil the solution is stirred into 220 parts of neutralized tragacanth thickening (60/1000) and the further addition made of 40 parts of urea.

With this printing color there is obtained on cotton or regenerated cellulose after drying the print, steaming for 10 minutes and thoroughly rinsing, an excellently fixed, strong Bordeaux.

By using instead of the above mentioned copper compound 1 part of the copper compound of the dyestuff of the formula

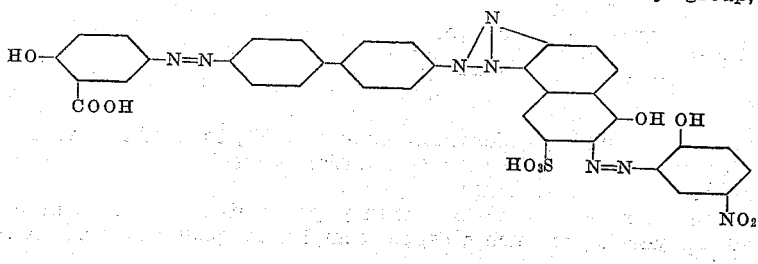

a reddish brown results which is likewise of very good fastness to light and washing.

In both cases there can be used instead of 1:2-di-(β-hydroxyethylamino)-ethane a condensation product which is obtained from 1 mol of 1:2-dichlorethane and either 2 mols of isopropanolamine or 2 mols of 2-amino-2-methylpropane or 2 mols of 1:3-dihydroxy-2-amino-2-methylpropane.

*Example 12*

1 part of the copper compound of the dyestuff of the formula

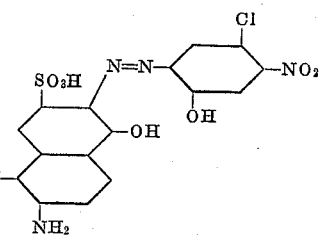

is mixed with 4 parts of 1:2-di-(β-hydroxyethylamino)-ethane and covered with 135 parts of hot water. After bringing the solution to the boil it is stirred into a mixture of 220 parts of neutralized tragacanth thickening (60/1000) and 40 parts of urea.

With this printing color there is obtained on cotton and regenerated cellulose, after the print has been dried, steamed for 10 minutes and thoroughly rinsed, an excellently fixed blackbrown of good fastness to light.

What is claimed is:

1. Process for printing with dyestuffs of substantive character which comprises applying to the material to be printed a printing preparation which contains a metal complex compound, which is difficultly soluble per se, of a substantive dyestuff, together with an organic nitrogen base which corresponds to the formula $$C_nH_{2n}=(-NH-\underset{R_2}{\overset{R_1}{C}}-CH_2-OH)_2$$

in which $R_1$ stands for a member of the group consisting of a nitrogen atom, an alkyl group with at most three carbon atoms and a hydroxymethyl group, and $R_2$ stands for a member of the group consisting of a hydrogen atom and a methyl group, and $n$ indicates a whole number which is at most 4, and which contains as printing thickening a vegetable gum substantially free from reducing properties.

2. Process for printing with dyestuffs of substantive character which comprises applying to the material to be printed a printing preparation which contains a copper complex compound, which is difficultly soluble per se, of a substantive dyestuff, together with 1:2-di-(β-hydroxyethylamino)-ethane, and which contains as printing thickening a vegetable gum substantially free

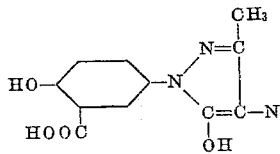 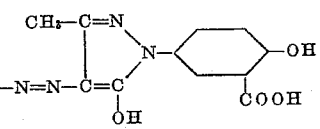

from reducing properties.

3. Process for printing with dyestuffs of substantive character which comprises, applying to the material to be printed a printing preparation which contains such a copper-complex compound of a substantive dyestuff as, in the absence of a base, possesses at 80° C. a solubility of less than 0.5 gram per liter in 1 per cent. sodium carbonate solution, and also contains 1:2-di-(β-hydroxyethylamino)-ethane and contains as printing thickening a vegetable gum substantially free from reducing properties.

4. Process for printing with dyestuffs of substantive character which comprises applying to the material to be printed a printing preparation which contains the copper-complex compound of the dyestuff of the formula

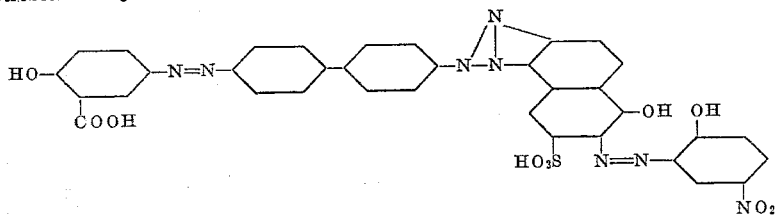

and 1:2-di-(β-hydroxyethylamino)-ethane and as a printing thickening a vegetable gum substantially free from reducing properties.

5. Process for printing with dyestuffs of substantive character which comprises applying to the material to be printed a printing preparation which contains the copper-complex compound of the dyestuff of the formula

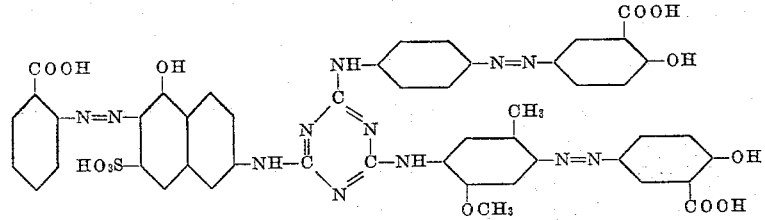

and 1:2-di-(β-hydroxyethylamino)-ethane and as a printing thickening a vegetable gum substantially free from reducing properties.

6. Process for printing with dyestuffs of substantive character which comprises applying to the material to be printed a printing preparation which contains the copper-complex compound of the dyestuff of the formula

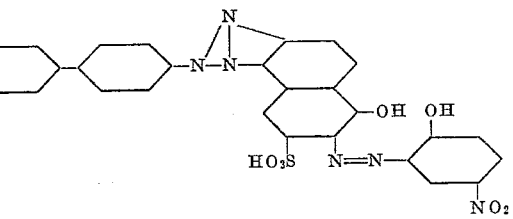

and 1:2-di-(β-hydroxyethylamino)-ethane and as a printing thickening a vegetable gum substantially free from reducing properties.

7. Process for printing with dyestuffs of substantive character which comprises applying to the material to be printed a printing preparation which contains the copper-complex compound of the dyestuff of the formula

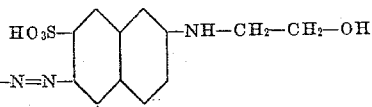

and 1:2-di-(β-hydroxyethylamino)-ethane and as a printing thickening a vegetable gum substantially free from reducing properties.

8. A printing preparation which contains a metal complex compound, which is difficultly soluble per se, of a substantive dyestuff, together with an organic nitrogen base which corresponds to the formula

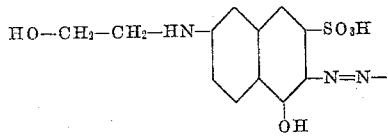

in which R₁ stands for a member of the group consisting of a hydrogen atom, an alkyl group with at most three carbon atoms and a hydroxymethyl group, and R₂ stands for a member of the group consisting of a hydrogen atom and a methyl group, and $n$ indicates a whole number which is at most 4, and which contains as printing thickening a vegetable gum substantially free from reducing properties.

9. A printing preparation which contains a copper complex compound, which is difficultly soluble per se, of a substantive dyestuff, together with 1:2-di-(β-hydroxyethylamino)-ethane, and which contains as printing thickening a vegetable gum substantially free from reducing properties.

10. A printing preparation which contains such a copper complex compound of a substantive dyestuff as, in the absence of a base, possesses at 80° C. a solubility of less than 0.5 gram per liter in 1 per cent. sodium carbonate solution, and also contains 1:2-di-(β-hydroxyethylamino)-ethane and contains as printing thickening a vegetable gum substantially free from reducing properties.

11. A printing preparation which contains the copper-complex compound of the dyestuff of the formula

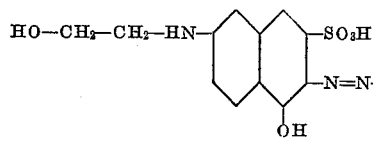

and 1:2-di-(β-hydroxyethylamino)-ethane and as a printing thickening a vegetable gum substantially free from reducing properties.

12. A printing preparation which contains the copper-complex compound of the dyestuff of the formula

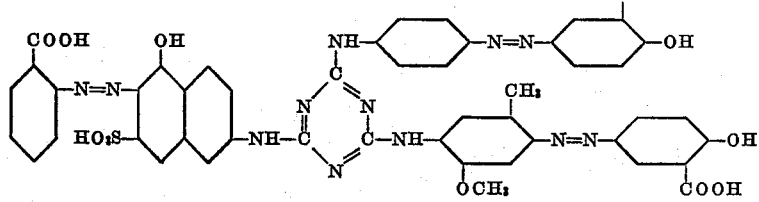

and 1:2-di-(β-hydroxyethylamino)-ethane and as a printing thickening a vegetable gum substantially free from reducing properties.

13. A printing preparation which contains the copper-complex compound of the dyestuff of the formula

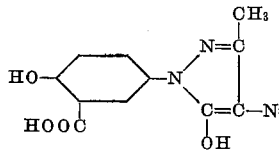 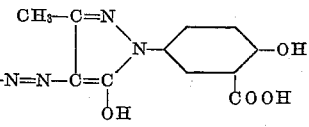

and 1:2-di-(β-hydroxyethylamino)-ethane and as a printing thickening a vegetable gum substantially free from reducing properties.

14. A printing preparation which contains the copper-complex compound of the dyestuff of the formula

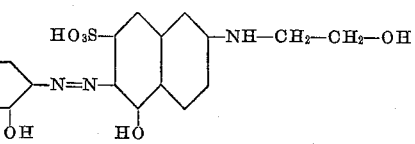
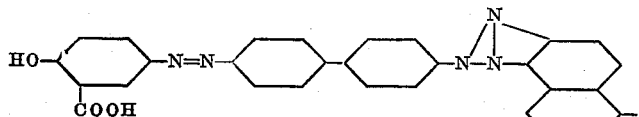
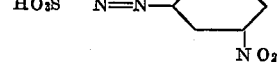

and 1:2-di-(β-hydroxyethylamino)-ethane and as a printing thickening a vegetable gum substantially free from reducing properties.

References Cited in the file of this patent

UNITED STATES PATENTS

| Number | Name | Date |
|---|---|---|
| 1,904,013 | Reid | Apr. 18, 1933 |
| 2,036,159 | Mendoza | Mar. 31, 1936 |
| 2,092,429 | Straub | Sept. 7, 1937 |
| 2,256,806 | Kern | Sept. 23, 1941 |

FOREIGN PATENTS

| Number | Country | Date |
|---|---|---|
| 468,362 | Great Britain | June 30, 1937 |